(12) United States Patent
Pham et al.

(10) Patent No.: US 7,584,048 B2
(45) Date of Patent: Sep. 1, 2009

(54) PORTABLE POSITIONING AND NAVIGATION SYSTEM

(75) Inventors: Thanh Q. Pham, New Hope, MN (US); Robert C. Becker, Eden Prairie, MN (US); Paul E. Bauhahn, Fridley, MN (US)

(73) Assignee: Honeywell International Inc., Morristown, NJ (US)

( * ) Notice: Subject to any disclaimer, the term of this patent is extended or adjusted under 35 U.S.C. 154(b) by 422 days.

(21) Appl. No.: 11/470,039

(22) Filed: Sep. 5, 2006

(65) Prior Publication Data

US 2008/0082258 A1 Apr. 3, 2008

(51) Int. Cl.
*G01C 21/30* (2006.01)
(52) U.S. Cl. ............................ 701/208; 342/357.08
(58) Field of Classification Search .............. 701/208, 701/200; 342/357.08; 340/995, 988
See application file for complete search history.

(56) References Cited

U.S. PATENT DOCUMENTS

| | | | |
|---|---|---|---|
| 5,802,492 A | 9/1998 | DeLorme et al. | |
| 5,987,380 A | 11/1999 | Backman et al. | |
| 6,124,826 A | 9/2000 | Garthwaite et al. | |
| 6,127,945 A | 10/2000 | Mura-Smith | |
| 6,415,223 B1 | 7/2002 | Lin et al. | |
| 6,424,264 B1 | 7/2002 | Giraldin et al. | |
| 6,509,908 B1 | 1/2003 | Croy et al. | |
| 6,618,683 B1 | 9/2003 | Berstis et al. | |
| 6,650,326 B1 | 11/2003 | Huber et al. | |
| 6,661,335 B1 | 12/2003 | Seal | |
| 6,774,782 B2 | 8/2004 | Runyon et al. | |
| 6,920,330 B2 | 7/2005 | Caronni et al. | |
| 7,005,968 B1 | 2/2006 | Bridgelall | |

| | | |
|---|---|---|
| 2001/0032236 A1 | 10/2001 | Lin |
| 2001/0040512 A1 | 11/2001 | Hines et al. |

(Continued)

FOREIGN PATENT DOCUMENTS

EP 0650074 4/1995

(Continued)

OTHER PUBLICATIONS

"Palmsource Handhelds—Web advertisement", Aug. 24, 2005, Publisher: www.palmsource.com/products/products.cgi?Cat=Handhelds.

(Continued)

*Primary Examiner*—Mark Hellner
(74) *Attorney, Agent, or Firm*—Fogg & Powers LLC

(57) ABSTRACT

A navigation system to aid in the navigation through an unknown area. The navigation system includes a plurality of radio frequency identification (RFID) tags, at least one a portal terminal and at least one navigation device. The plurality of RFID tags are positioned throughout an area to be traversed. The at least one portal terminal is located near an entrance to the area to be traversed. The at least one portal terminal is adapted to upload a map of the area to be traversed. The map includes the location of each RFID tag. The at least one navigation device is adapted to download the map from the portal terminal. The at least one navigational device is further adapted to display its location in the area to be traversed based at least in part on the detection of one or more of the plurality of RFID tags.

19 Claims, 6 Drawing Sheets

U.S. PATENT DOCUMENTS

| | | | |
|---|---|---|---|
| 2001/0054066 A1 | 12/2001 | Spitzer | |
| 2002/0163443 A1 | 11/2002 | Stewart et al. | |
| 2003/0013459 A1* | 1/2003 | Rankin et al. | |
| 2003/0155413 A1 | 8/2003 | Kovesdi et al. | |
| 2003/0214387 A1 | 11/2003 | Giaccherini | |
| 2004/0068368 A1 | 4/2004 | Adams, Jr. et al. | |
| 2004/0149031 A1 | 7/2004 | Vesuna | |
| 2004/0174269 A1 | 9/2004 | Miller et al. | |
| 2004/0185822 A1 | 9/2004 | Tealdi et al. | |
| 2004/0217864 A1 | 11/2004 | Nowak et al. | |
| 2004/0243307 A1 | 12/2004 | Geelen | |
| 2004/0252034 A1 | 12/2004 | Slemmer et al. | |
| 2005/0001720 A1 | 1/2005 | Mason et al. | |
| 2005/0048987 A1 | 3/2005 | Glass | |
| 2005/0060088 A1 | 3/2005 | Helal et al. | |
| 2005/0067492 A1 | 3/2005 | Amitay et al. | |
| 2005/0068168 A1 | 3/2005 | Aupperle et al. | |
| 2005/0093745 A1 | 5/2005 | Krumm et al. | |
| 2005/0107934 A1 | 5/2005 | Gudat et al. | |
| 2005/0116020 A1 | 6/2005 | Smolucha et al. | |
| 2005/0246248 A1* | 11/2005 | Vesuna | 705/28 |
| 2006/0135183 A1 | 6/2006 | Zavada et al. | |
| 2007/0001904 A1 | 1/2007 | Mendelson | |
| 2007/0069923 A1* | 3/2007 | Mendelson | 340/988 |
| 2007/0126634 A1 | 6/2007 | Bye | |
| 2008/0042829 A1* | 2/2008 | Christopher | 340/539.13 |

FOREIGN PATENT DOCUMENTS

| | | |
|---|---|---|
| EP | 1074959 | 2/2001 |
| EP | 1126399 | 8/2001 |
| GB | 2322248 | 8/1998 |
| JP | 2004251816 | 9/2004 |
| JP | 2005055186 | 3/2005 |
| WO | 9959334 | 11/1999 |
| WO | WO 0231787 | 4/2002 |
| WO | 2004074777 | 9/2004 |
| WO | WO 2005010798 | 2/2005 |

OTHER PUBLICATIONS

Vladimir Kulykin et al., "RFID in Robot-Assisted Indoor Navigation for the Visually Impaired", Sep. 20, 2004, Publisher: Utah State University, Department of Computer Science, Published in: Logan, Utah.

Leonard E. Miller et al., "RFID-Assisted Localization & Communication for 1st Responders", Aug. 23, 2005.

Ichiro Satoh, "A Location Model for Pervasive Computing Environments", "Third IEEE International Conference on Pervasive Computing and Communications", Mar. 8, 2005, pp. 215-224, Publisher: IEEE.

* cited by examiner

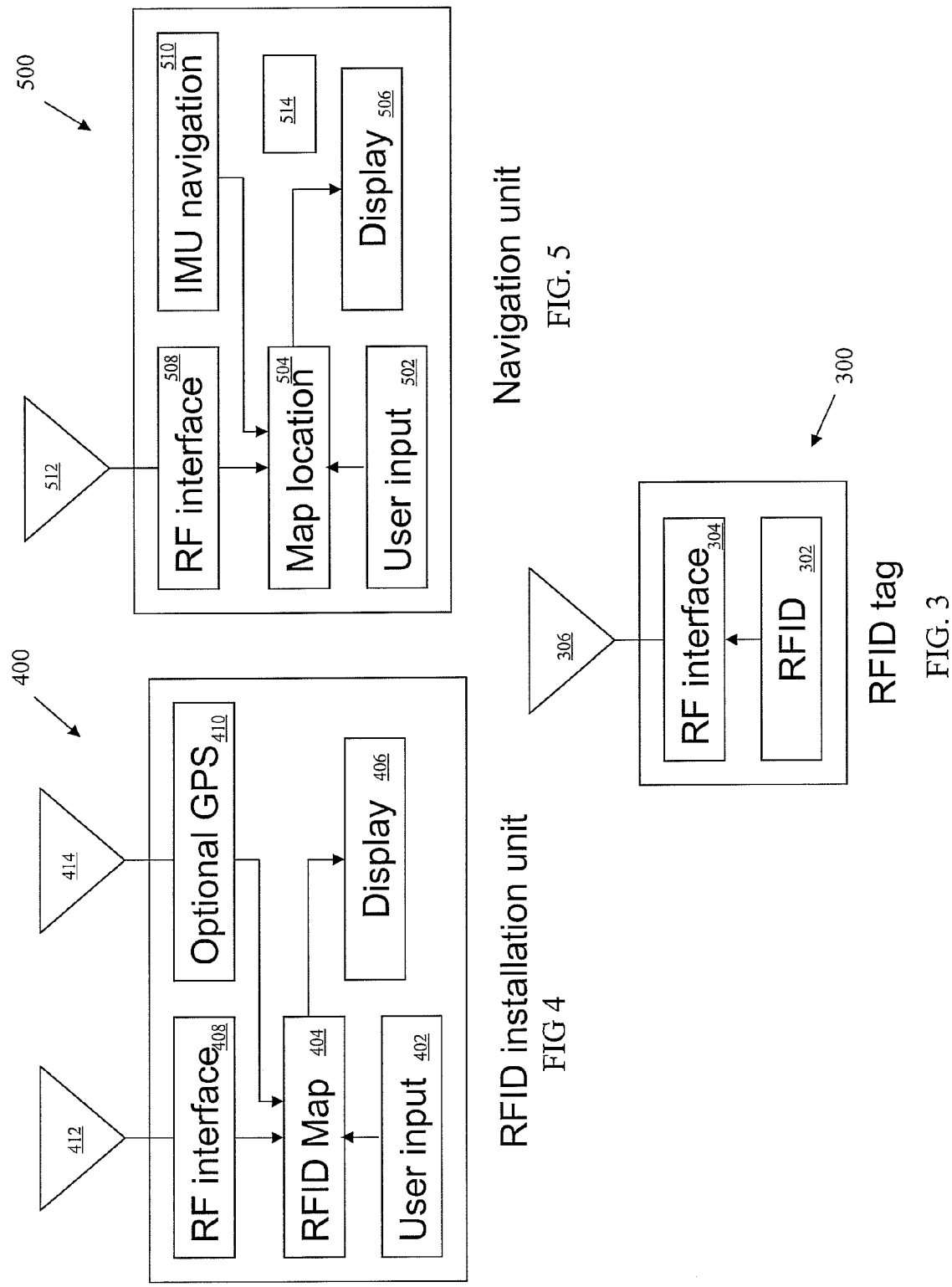
FIG. 5 Navigation unit
FIG. 3 RFID tag
FIG. 4 RFID installation unit

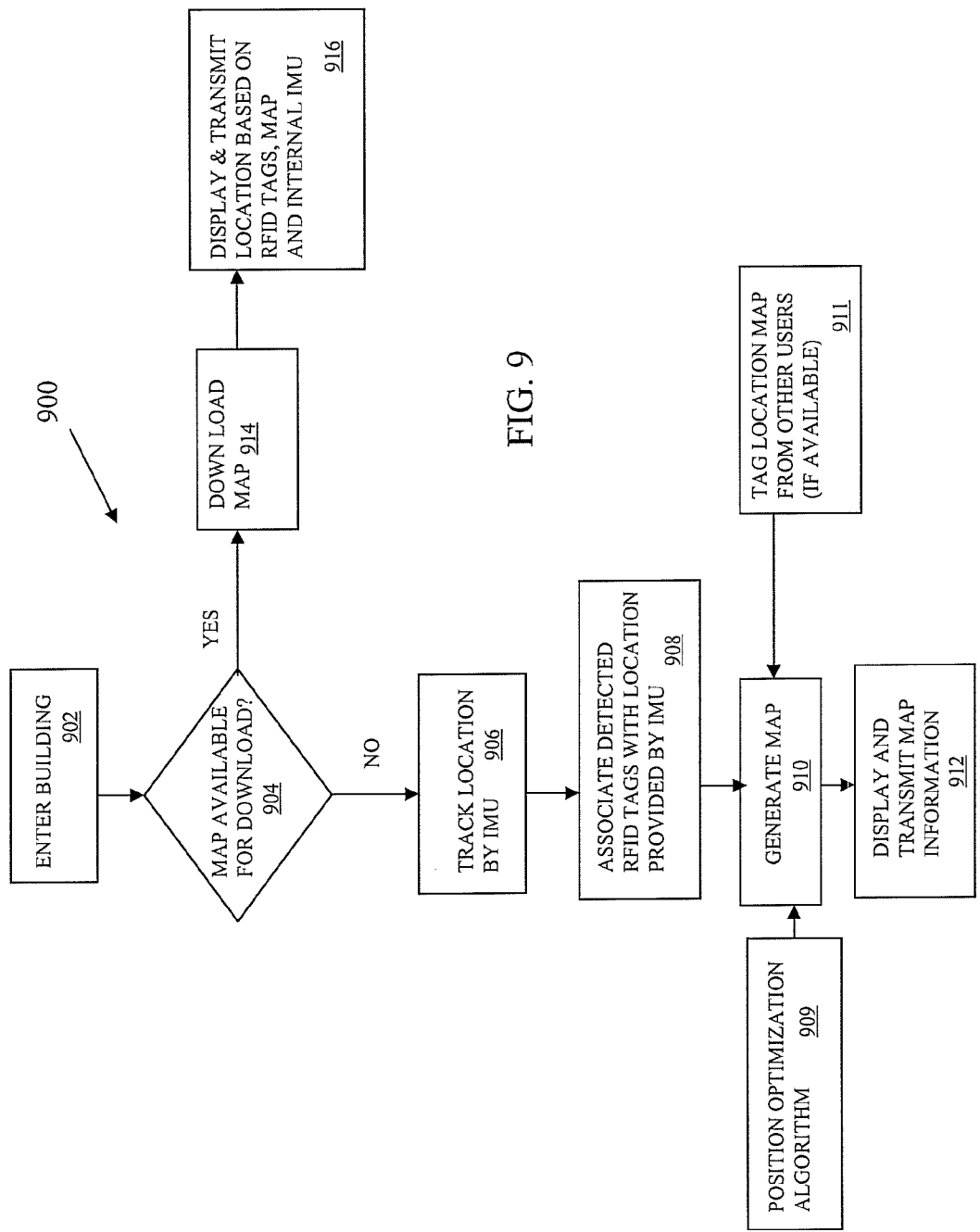

US 7,584,048 B2

PORTABLE POSITIONING AND NAVIGATION SYSTEM

BACKGROUND

The navigation of buildings or other areas unfamiliar to a person can be challenging. This becomes especially true during emergency situations such as a fire. In particular, fire fighters arriving to fight a fire at an unfamiliar building have the added challenge of navigating through an unfamiliar building. Moreover, the ability to efficiently coordinate a search of a building or area with multiple people can be a challenge when the building or area is unfamiliar to the searchers. This efficiency of the search is further hampered when the searchers do not know the locations or past locations of other searchers. Hence a specific area can be needlessly searched multiple times while other areas can be missed entirely.

For the reasons stated above and for other reasons stated below which will become apparent to those skilled in the art upon reading and understanding the present specification, there is a need in the art for an efficient and effective way of conveying navigational information to an individual traversing through a building or location.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention. A personal location and navigation system is provided. In one embodiment, the navigation system includes a plurality of radio frequency identification (RFID) tags, at least one a portal terminal and at least one navigation device. The plurality of RFID tags are positioned throughout an area to be traversed. The at least one portal terminal is located near an entrance to the area to be traversed. The at least one portal terminal is adapted to upload a map of the area to be traversed. The map includes the location of each RFID tag. The at least one navigation device is adapted to download the map from the portal terminal. The at least one navigational device is further adapted to display its location in the area to be traversed based at least in part on the detection of one or more of the plurality of RFID tags.

BRIEF DESCRIPTION OF THE DRAWINGS

The present invention can be more easily understood and further advantages and uses thereof more readily apparent, when considered in view of the description of the preferred embodiments and the following figures in which:

FIG. 3 is an RFID tag of one embodiment of the present invention;

FIG. 4 is an RFID installation unit of one embodiment of the present invention;

FIG. 5 is a navigation unit of one embodiment of the present invention;

FIG. 9 is a flow diagram illustrating another method of implementing embodiments of the present invention.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a method of providing information to a user regarding the user's location in regards to a building or other defined area. In one embodiment, a plurality of the radio frequency identification (RFID) tags are placed throughout the building or area to be traversed. The position of each RFID tag is mapped. In one embodiment, the map is uploaded to one or more portal terminals. The portal terminals are located near entrances to the building or area. When a user enters a building with a dedicated navigation device of embodiments of the present invention, the map is downloaded. In embodiments of the present invention, in response to the downloading of the map, the navigation device displays location information based on sensed RFIDs and the map. In one embodiment, the navigation device transmits location information based on the RFIDs to a central tracking point or other navigation systems. Moreover, in another embodiment, an internal IMU system is used to further define locations of the navigational device.

Figure 1:
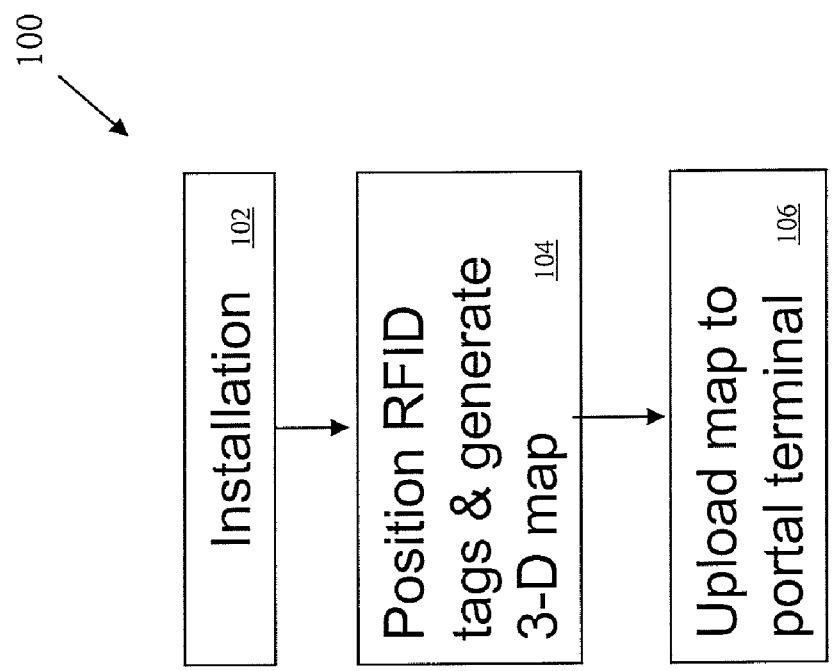
FIG. 1 is a flow diagram illustrating the formation of a location system at a building of one embodiment of the present invention.

Referring to FIG. 1, a flow diagram illustrating the formation of a location system at a building or area of one embodiment of the present invention is illustrated. As illustrated, the location system is installed (102), by positioning RFID tags throughout the building or location (104). Each RFID tag contains an ID number. In one embodiment, the RFID tag also includes location information. A map of the locations of the RIFD tags is then generated (104). In one embodiment, this is done by documenting the location manually in an electronic map. If the location to be mapped is a structure with different levels, such as a building with different floors, a three dimensional map is generated. Once the map has been created, in one embodiment, the map is uploaded to a portal terminal as illustrated in the flow diagram of FIG. 1 (106). In other embodiments, the map is downloaded to handheld navigational devices. In still another embodiment, the map can be uploaded into a database that can be accessed by the internet.

Figure 2:
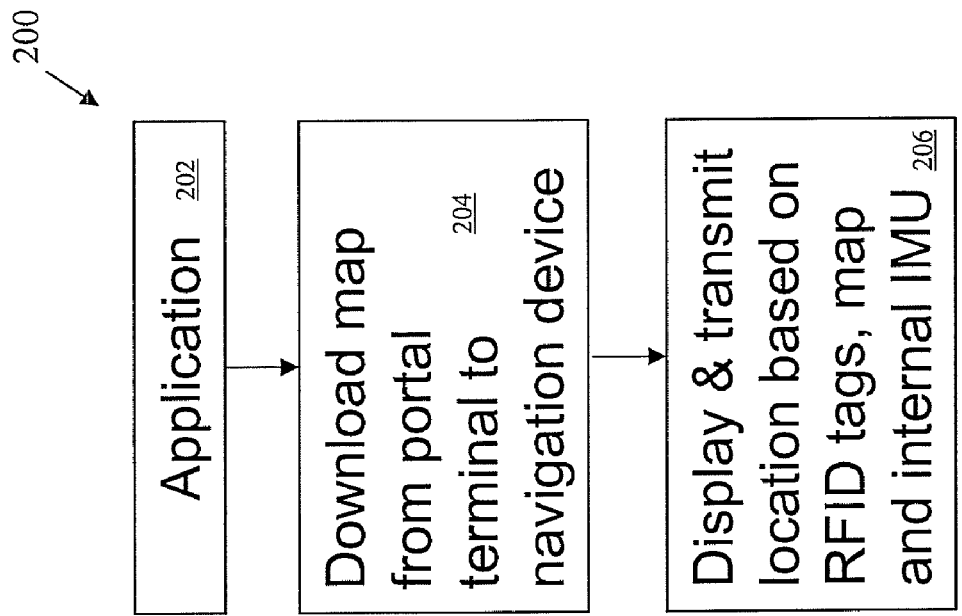
FIG. 2 is a flow diagram of an application of a location system of one embodiment of the present invention.

FIG. 2 illustrates a flow diagram 200 of the application (202) of a navigation system of one embodiment of the present invention. In the embodiment of FIG. 2, the map is downloaded from a portal terminal to a navigational device held by the user (204). In one embodiment, this is done via wireless connection between the portal terminal and the navigational device. In other embodiments this is done with a hardwired connection. Once the map has been downloaded to the navigation device, the location of a user in relation to the map is displayed by the device based in part on signals of the RFID tags (206). In one embodiment, the location of the navigation device is transmitted. This embodiment allows for the tracking of the navigation device remotely. In another embodiment, an Inertia Measurement Unit (IMU) is included in the navigation device. An IMU is used to help the user to navigate through blind spots in the coverage of the RFID tags. The IMU uses mathematical models to predict the location of the navigation device based on past movement and past sensed RIFD tags. To account for low accuracy of the IMU, upon detecting a tag, software in the navigation device will automatically use the newly located tag location as a calibration point and draw a straight line between tag locations. This reduces movement pattern variation due to low IMU accuracy.

A block diagram of an RFID tag 300 is illustrated in FIG. 3. As illustrated, the RFID tag 300 includes an RFID 302 that is unique to each RFID tag 300. Each RFID tag 300 further includes an RF interface 304 and an antenna 306. In one embodiment, the RFID 302 also includes information regarding the tag's location that is programmed in when placed at an associated location. An advantage of using the RFID tags 300 in the navigation system is that the RFID tags 300 are relatively cheap to design and build and require no maintenance. In one embodiment, they are disposable.

In one embodiment, an RFID installation unit 400 is used to set up the map of the RFIDs throughout the building or other location. An example of a block diagram of a RFID installation unit 400 is illustrated in FIG. 4. As illustrated, the RFID installation unit 400 includes a RFID map 404 that receives information from different sources in compiling a map of the RFID tags. One of the sources is an RF interface 408 that is coupled to an antenna 412 to receive RF signals from the RFID tags themselves placed throughout the building or area. Another input is a user input 402 that is used to manually place the location of each RFID tag on the map at its associated location. In one embodiment, a global positioning system (GPS) is further used to place each RFID in the map. The GPS 410 is coupled to antenna 414 to receive a GPS signal. Also included in the embodiment of FIG. 4 is a display 406 to display the locations of each RFID tags entered in the map.

FIG. 5 illustrates a block diagram of a navigation unit (or device) 500 of one embodiment of the present invention. As illustrated, the navigation device 500 includes an antenna 512 coupled to an RF interface 508. The navigation device 500 also includes a map location module 504. The map location module 504 is in communication with the RF interface 508. When the RF interface 508 receives a signal from the antenna 512 that a RFID tag has been detected, the RF interface 508 sends the information along to the map location module 504. The map location module 504 processes the information and associates the detection of the RFID tag with a point on the map. As illustrated, the map location also receives information from the IMU navigation module 510. This information allows the map location module 504 to predict locations based on estimates in blind spots in the building or location. This embodiment further includes a user input 502. The user input 502 provides such functions as polling the map location module 504 to display a current location based on either a signal from the RF interface 508 or an IMU navigation estimate from the IMU navigation module 510. Also included in the embodiment of FIG. 5 is a display 506 to display the location information. In one embodiment, the navigation unit 500 uses the RF interface 508 and the antenna 512 to transmit information regarding the location of the navigation unit 500, as determined by the map location module 504, to a remote unit or another navigating device. Further in one embodiment, the map location module 504 includes a memory 514 to store past location information (path taken information).

Figure 6:
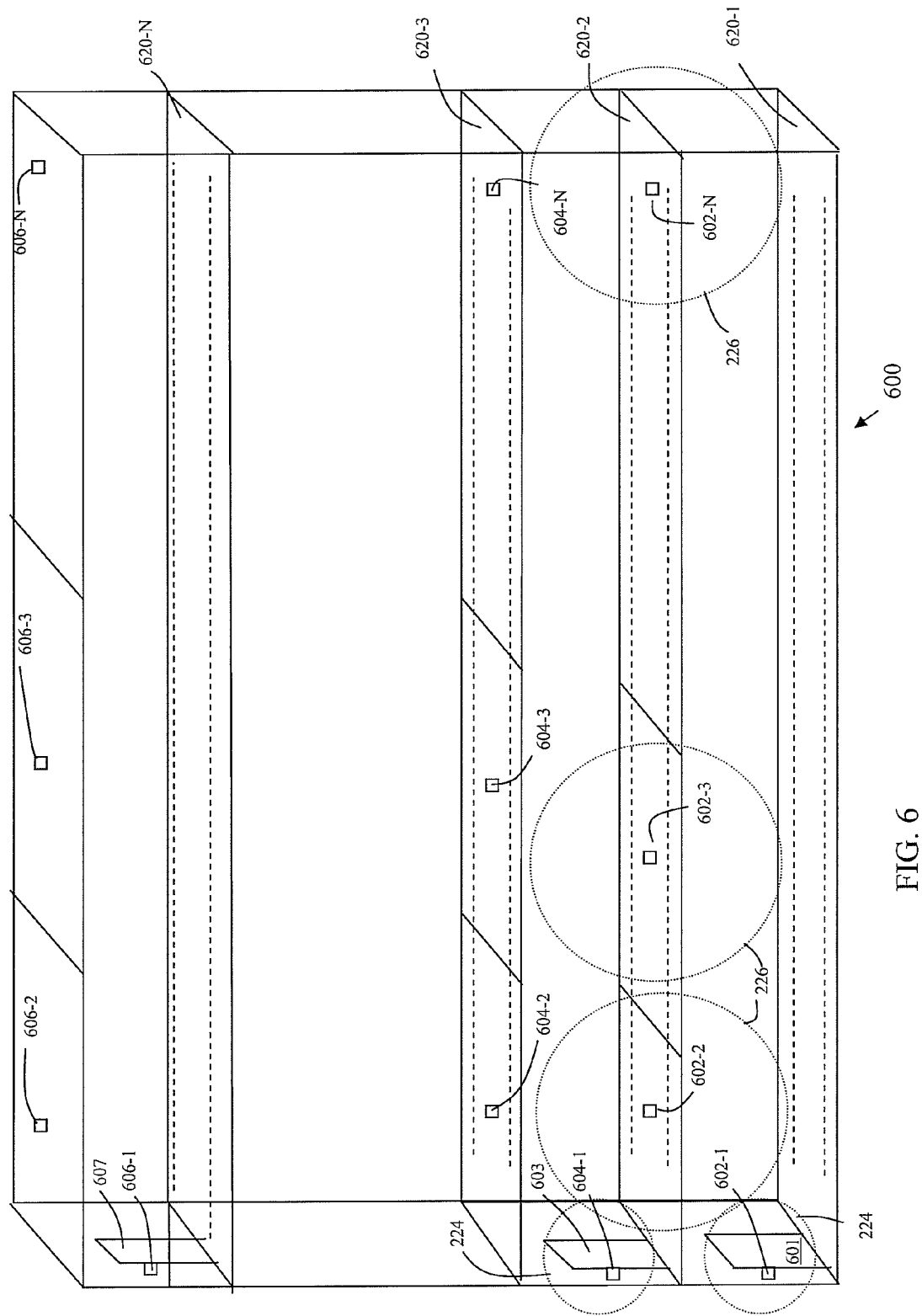
FIG. 6 is a cross-sectional side view of a building implementing RFID tags of one embodiment of the present invention.

Referring to FIG. 6, a cross-sectional side view of a building with RFID tags of one embodiment of the present invention placed throughout different floors is illustrated. As illustrated in FIG. 6, the building 600 includes floors 620(1-N). The RFID tags are placed along the hallways of the floors 620 (1-N). In particular, a first floor 620-1 has RFID tags 602 (1-N) placed along the hallways of the floor 620-1. The second floor has RFID tags 604 (1-N) placed along its hallways. Moreover, the Nth floor 620-N has RFID tags 606 (1-N) placed along its hallways. At least one of the RFID tags is placed near each floor entrance in one embodiment of the present invention. For example, RFID tag 602-1 is placed near entrance 601 to the first floor 620-1, RFID tag 604-1 is placed near entrance 603 to the second floor 620-2 and RFID tag 606-1 is placed near the entrance 607 to the Nth floor 620-N. Also illustrated in FIG. 6, is a detectable range for RFID tags. As illustrated, different detectable ranges are provided depending on the strength of the signal produced by the RFID. For example, detectable ranges 226 for RFID tags 602-2, 602-3 and 602-N are larger than the detectable ranges 224 for RFID tags 602-1 and 604-1 placed near the respective entrances 601 and 603. Moreover, in one embodiment, received signal strength (RSS) techniques are implemented in confirming specific RFID tag detection. RSS techniques compare received signal power data from the RFID tags with a mathematical model (stored in the navigation device) to confirm the detection of a specific RFID tag. This embodiment takes advantage of direct and short sensing distance to RFID tags. It is also a relatively non-complex solution to implement.

Figure 7:
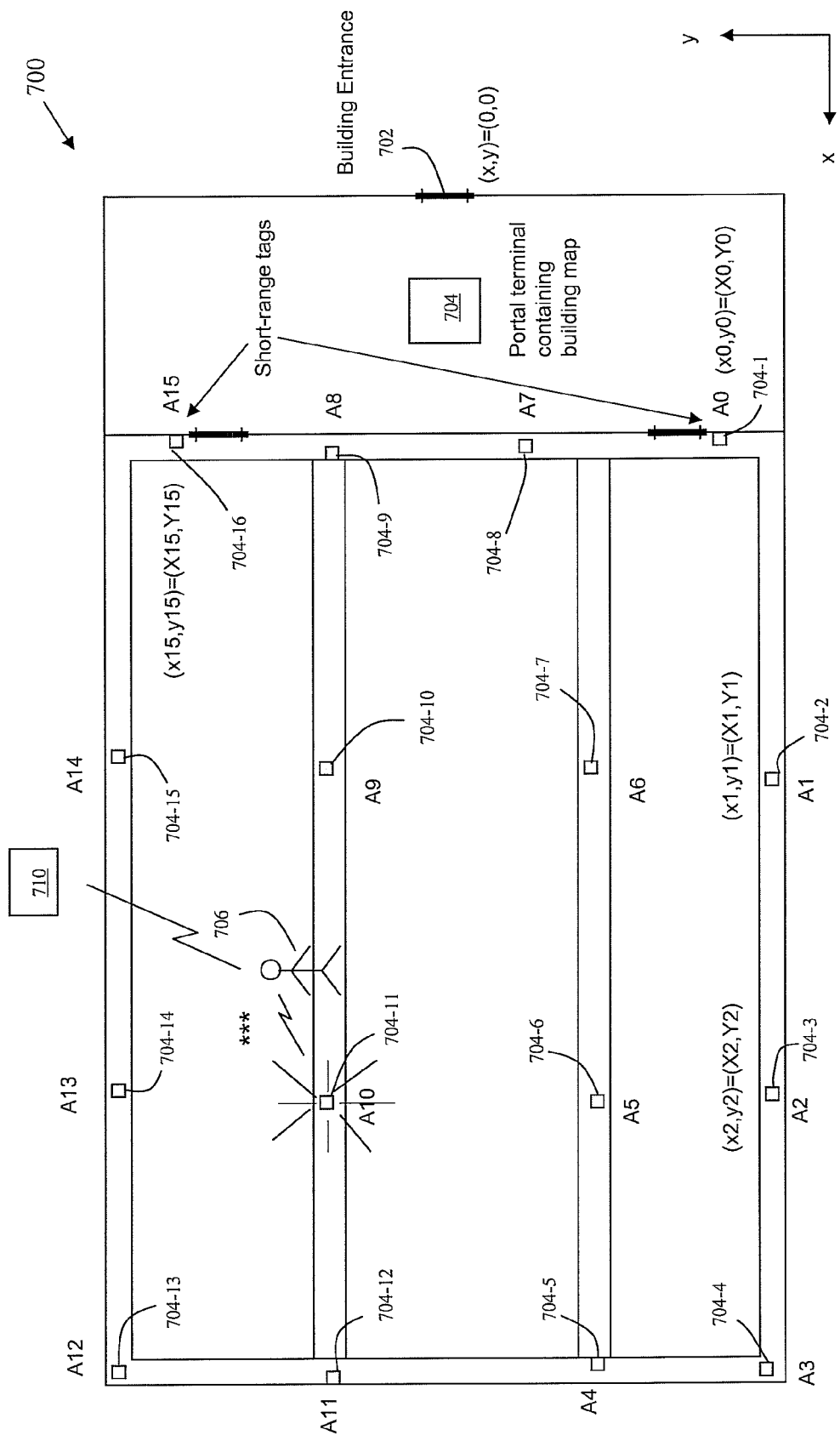
FIG. 7 is a cross-sectional top view of a single floor in a building implementing a plurality of RFID tags and a portal terminal of one embodiment of the present invention.

In FIG. 7, a cross-sectional top view of a single floor in a building 700 having a plurality of RFID tags placed along hallways of one embodiment of the present invention is illustrated. As illustrated, RFID tags 704 (1-16) are placed throughout the halls of the floor. RFID tags 704-1 and 704-16 near the entrances 705 and 707 to the halls are short range tags. Also illustrated in FIG. 7 is portal terminal 704 that in one embodiment downloads a map of the building to a navigation device upon passing through the building entrance 702. Also illustrated are location coordinates. For example, RFID tag 704-3 has a location coordinate (x2,y2). In some embodiments of the present invention, the navigation device will have a display that conveys the current location with a blinking light on the downloaded map based on the detection of a RFID tag signal. In one embodiment of the present invention, solar powered RFID tags are used. Also illustrated in FIG. 7 is a remote unit 710. In one embodiment, the navigation device sends a copy of the map and location information to the remote unit 710. This allows for the remote monitoring of the navigation device.

Figure 8A:
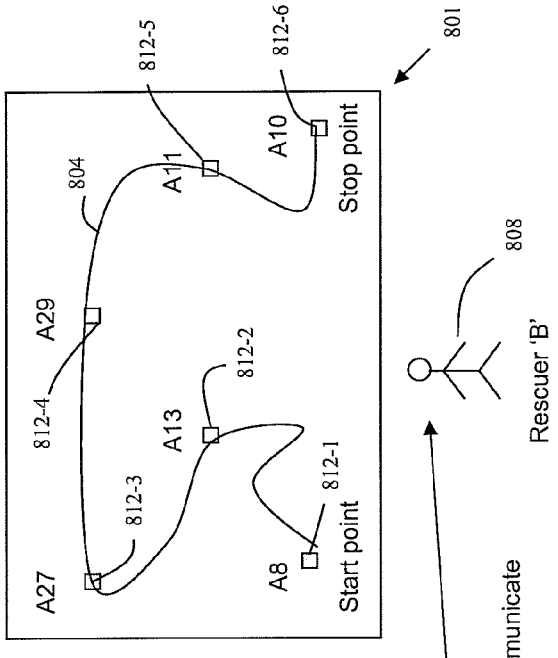
FIG. 8A illustrates an actual path of a first fire rescuer through a building in one embodiment of the present invention.
Figure 8B:
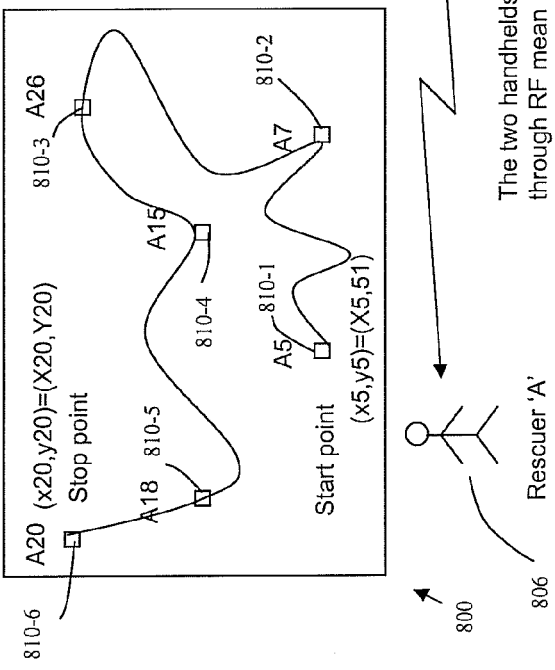
FIG. 8B illustrates an actual path of a second fire rescuer through a building in one embodiment of the present invention.
Figure 8C:
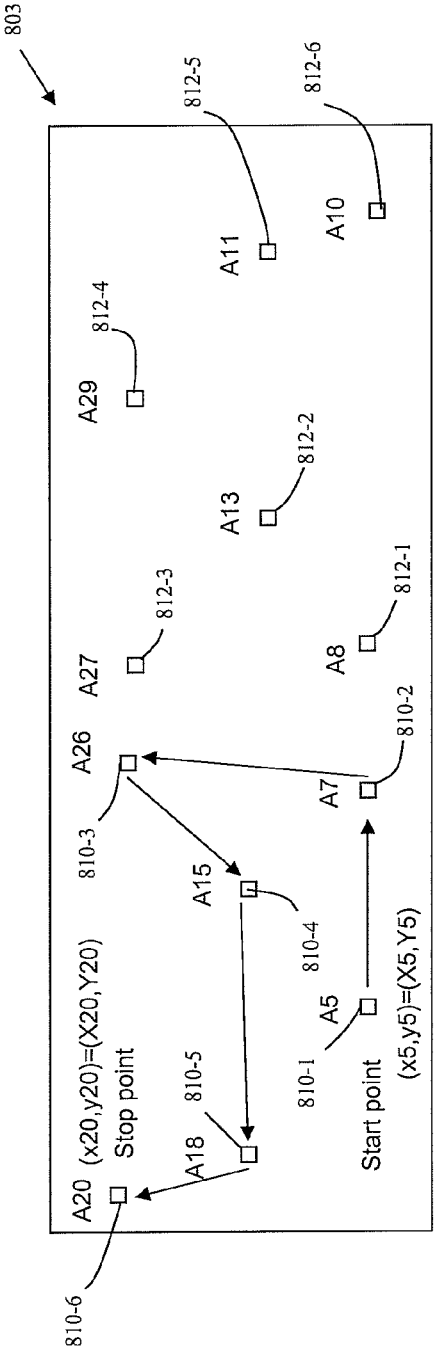
FIG. 8C illustrates a display map of a navigation device held by the first fire rescuer of one embodiment of the present invention.

In one embodiment of the present invention, integration of an inertia measurement unit (IMU) as well as a user's collaboration of location navigation is used. This technique is especially useful in emergency situations such as during a fire rescue. For example, please refer to FIGS. 8A, 8B and 8C. FIG. 8A illustrates the actual path of a first fire rescuer 806 navigating through a northwest corner 800 of a building. As illustrated, the first fire rescuer 806 passes by RFID tags 810 (1-6). FIG. 8B illustrates the actual path of a second fire rescuer 808 navigating through a northeast corner 801 of the same building. As illustrated, the second fire rescuer 808 passes by RFID tags 812 (1-6). In this embodiment, a navigation devices (which are handheld devices) carried by each fire rescuer 'A' and 'B' are in RF communication with each other so as to exchange information. Hence, each fire rescuer 806 and 808 has knowledge of where other fire rescuers have already been as well as the ability to find the location of another rescuer if a problem occurs. FIG. 8C illustrates a display map 803 of a navigation system held by the first fire rescuer 806. Display map 803 is a combination of the RFID tags 810 (1-6) and 812 (1-6) captured by both the first and second fire rescuers 806 and 808. This display also shows the path taken by the first rescuer 806. In one embodiment, the display map held by the second rescuer 808 would show the same path taken by the first rescuer 806. Accordingly, the location of the RFID tags 810 (1-6) and 812 (1-6) are being generated and shared by the rescuers 806 and 808 as they traverse through the building. Although only two rescuers were shown in this example, it is understand that any number of rescuers could be sharing the information between each other. Moreover, in one embodiment, the navigation devices share information with a control unit or remote unit via RF communications as described above in regards to FIG. 7. In an embodiment where there are multiple navigation devices in use in an area where there are also multiple RFID tags, a random time delay approach is applied. In this embodiment, a random time delay is introduced in the transmitting and receiving signals to avoid collision among multiple-users and multiple-RFID tags.

Referring to FIG. 9, a flow chart 900 illustrating the implementation of another embodiment of the present invention is provided. In this embodiment, the process starts when an individual with a navigation device enters a building (or area) that has RFID tags placed throughout (902). It is then determined if a map of the RFID tags is available by a portal (904). If a map is available (904), it is downloaded to the personal navigation device (914). The navigation device then uses the downloaded map to display and transmit location information based on sensed RFID tags, the map and an internal IMU as the user tranverses the building (916).

If a map is not available to be downloaded (904), the location throughout the area is tracked by the internal IMU (906). This situation can occur if a fire or other disaster renders the portal inoperative and the download of the map is impossible. As the location is being tracked with the internal IMU (906), detected RFID tags are associated with a location determined by the IMU (908). A map of the path of the user and the location of detected RFID tags on the map based on the IMU is then generated by the navigation device (910). In one embodiment, a positioning optimization algorithm is applied to the locations provided by the IMU to enhance the accuracy of the map (909). Moreover, in one embodiment, tag location maps from other users (911) are used to generate the map (910). The maps from other users could be maps that the other users have generated or maps that other users have downloaded. In one embodiment, the maps from other users are communicated via RF communication means. The navigation device then displays the location and transmits the map information (912). In one embodiment, the map information is transmitted to a remote unit 710. In another embodiment, the map information is transmitted to another navigational device. The map information is used in a similar fashion as discussed in regards to FIGS. 8A, 8B and 8C.

Although specific embodiments have been illustrated and described herein, it will be appreciated by those of ordinary skill in the art that any arrangement, which is calculated to achieve the same purpose, may be substituted for the specific embodiment shown. For example, even though some of the embodiments are directed towards search missions, aspects of the embodiments can be used for general navigational purposes through unfamiliar buildings and areas. This application is intended to cover any adaptations or variations of the present invention. Therefore, it is manifestly intended that this invention be limited only by the claims and the equivalents thereof.

The invention claimed is:

1. A method of traversing through an unknown area, the method comprising:
   when detecting an operating portal upon entering an area to be traversed, downloading a map that includes locations of radio frequency identification (RFID) tags positioned throughout the area to be traversed to a navigation device; and
   providing location information with the navigation device while moving through the area to be traversed via the map based at least in part on detected RFID tags and an inertia measurement unit (IMU) wherein providing location information further comprises:
   when the navigation device is not within the coverage area of an RFID tag, navigating with the IMU; and
   predicting the location of the navigation device based on past movement determined by the IMU and past sensed RFID tags.

2. The method of claim 1, further comprising:
   placing a plurality of radio frequency identification (RFID) tags throughout the area to be traversed; and
   indicating the location of each RFID tag on the map of the area to be traversed.

3. The method of claim 2, wherein indicating the location of the each RFID tag on the map further comprises:
   using a global positioning system (GPS) to provide coordinates of each RFID tag.

4. The method of claim 1, further comprising:
   when an operating portal is not detected upon entering the area to be traversed, using the IMU of the navigation to generate location information.

5. The method of claim 4, further comprising:
   generating a map that includes locations of detected RFIDs based on the location information.

6. The method of claim 4, further comprising:
   storing path taken data with the navigation device.

7. The method of claim 4, further comprising:
   communicating location information to a remote unit.

8. The method of claim 4, further comprising:
   sharing location information with at least one other navigation device.

9. The method of claim 4, further comprising:
   combining location information with the at least one other navigation device.

10. A navigation system, the navigation system comprising:
    a plurality of radio frequency identification (RFID) tags positioned throughout an area to be traversed;

at least one portal terminal located near an entrance to the area to be traversed, the at least one portal terminal adapted to upload a map of the area to be traversed, the map including the location of each RFID tag; and at least one navigation device adapted to download the map from the at least one portal terminal, the at least one navigational device adapted to display its location in the area to be traversed based in part on the detection of one or more of the plurality of RFID tags and an inertial measurement unit (IMU), wherein the IMU is operable to provide position information in areas not covered by an RFID tag and predict the location of the navigation device based on past movement and past sensed RFID tags.

11. The navigation system of claim 10, further comprising:

a remote unit in communication with the at least one navigation device, wherein the navigation device communicates the map and location information to the remote unit.

12. The navigation system of claim 10, wherein each of the plurality of RFID tags has a select signal range, further wherein the placement of each RFID tag within the area to be traversed is dependant on its select signal range.

13. The navigation system of claim 10, wherein the at least one navigation device includes at least two navigation devices adapted to exchange location information.

14. The navigation system of claim 10, further comprising:

an RFID installation unit adapted to generate the map including the location of the plurality of RFID tags.

15. The navigation system of claim 14, wherein the RFID installation unit further comprises:

a user input adapted to allow a user to define the location of each of the plurality of RFID tags in relation to the map; and a display adapted to display the placement of each RFID tag in the map.

16. The navigation system of claim 14, wherein the RFID installation unit further comprises:

a global positioning system (GPS) adapted to provide location information for each of the plurality of RFID tags in relation to the map.

17. A navigation device comprising:

a map location module adapted to download a map of an area to be traversed that includes the location of radio frequency identification (RFID) tags placed within the area to be traversed, the map location module further adapted to determine a location within the area to be traversed;

an antenna in communication with the map location module adapted to sense the signals from the RFID tags, wherein the map location model determines a location within the map based at least in part on the signals from the RFID tags sensed by the antenna;

an inertia measurement unit (IMU) in communication with the map location module to provide further information regarding location to the map location module, wherein the further information comprises:

position information when the navigation device is not within the coverage area of an RFID tag; and predictions of the location of the navigation device based on past movement determined by the IMU and past sensed RFID tags; and a display in communication with the map location module to display location information.

18. The navigation device of claim 17, wherein the map location module is further adapted to exchange location information with other navigation devices.

19. The navigation device of claim 17, the map location module further adapted to generate a location map and provide positioning information based on detected RFID tags and location information provided by the IMU when a map of the area to be traversed cannot be downloaded.

* * * * *